(12) United States Patent
Jones

(10) Patent No.: US 8,058,619 B2
(45) Date of Patent: Nov. 15, 2011

(54) RADIATION DETECTOR

(75) Inventor: Keith D. Jones, Macedonia, OH (US)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 12/413,041

(22) Filed: Mar. 27, 2009

(65) Prior Publication Data

US 2010/0243905 A1  Sep. 30, 2010

(51) Int. Cl.
*G01T 1/20* (2006.01)
(52) U.S. Cl. .................................... 250/361 R
(58) Field of Classification Search ............... 250/252.1, 250/253, 254, 261, 268, 269.1–269.8, 265, 250/336.1, 361 R; 175/40, 41, 50
See application file for complete search history.

(56) References Cited

U.S. PATENT DOCUMENTS

| 4,158,773 | A | * | 6/1979 | Novak ...................... 250/361 R |
|---|---|---|---|---|
| 5,962,855 | A | | 10/1999 | Frederick et al. |
| 6,355,932 | B1 | | 3/2002 | Frederick |
| 6,657,199 | B2 | | 12/2003 | Frederick et al. |
| 7,170,061 | B2 | | 1/2007 | Clarke et al. |
| 7,247,853 | B2 | | 7/2007 | Frederick et al. |
| 2002/0166973 | A1 | | 11/2002 | Frederick |
| 2005/0173639 | A1 | * | 8/2005 | Frederick et al. ........ 250/361 R |
| 2007/0145260 | A1 | * | 6/2007 | Frederick et al. .......... 250/269.3 |
| 2009/0152011 | A1 | * | 6/2009 | Hall et al. ................ 175/325.2 |
| 2010/0193693 | A1 | * | 8/2010 | Jones et al. .................. 250/367 |

FOREIGN PATENT DOCUMENTS

| GB | 2238809 A | 6/1991 |
|---|---|---|
| GB | 2437824 A | 11/2007 |
| WO | 03083512 A2 | 10/2003 |

OTHER PUBLICATIONS

GB 1004455.0, Great Britain Search Report, Jul. 28, 2010.

* cited by examiner

*Primary Examiner* — Constantine Hannaher
*Assistant Examiner* — Marcus Taningco
(74) *Attorney, Agent, or Firm* — Global Patent Operation

(57) ABSTRACT

A radiation detector comprises a tool housing. The tool housing has a substantially cylindrical tubular shape. A radiation sensor generates a signal in response to detecting radiation. The radiation sensor is locatable within the tool housing. A signal processor is operably connectable with the radiation sensor. The signal processor receives the signal from the radiation sensor and generates an electrical signal as a function of the signal received. The signal processor is locatable within the tool housing. A flex-sleeve supports at least one of the radiation sensor and signal processor within the tool housing. The flex-sleeve comprises a substantially cylindrical portion and a coaxially extending polygonal portion for engagement and supportive interaction with the cylindrical portion.

14 Claims, 5 Drawing Sheets

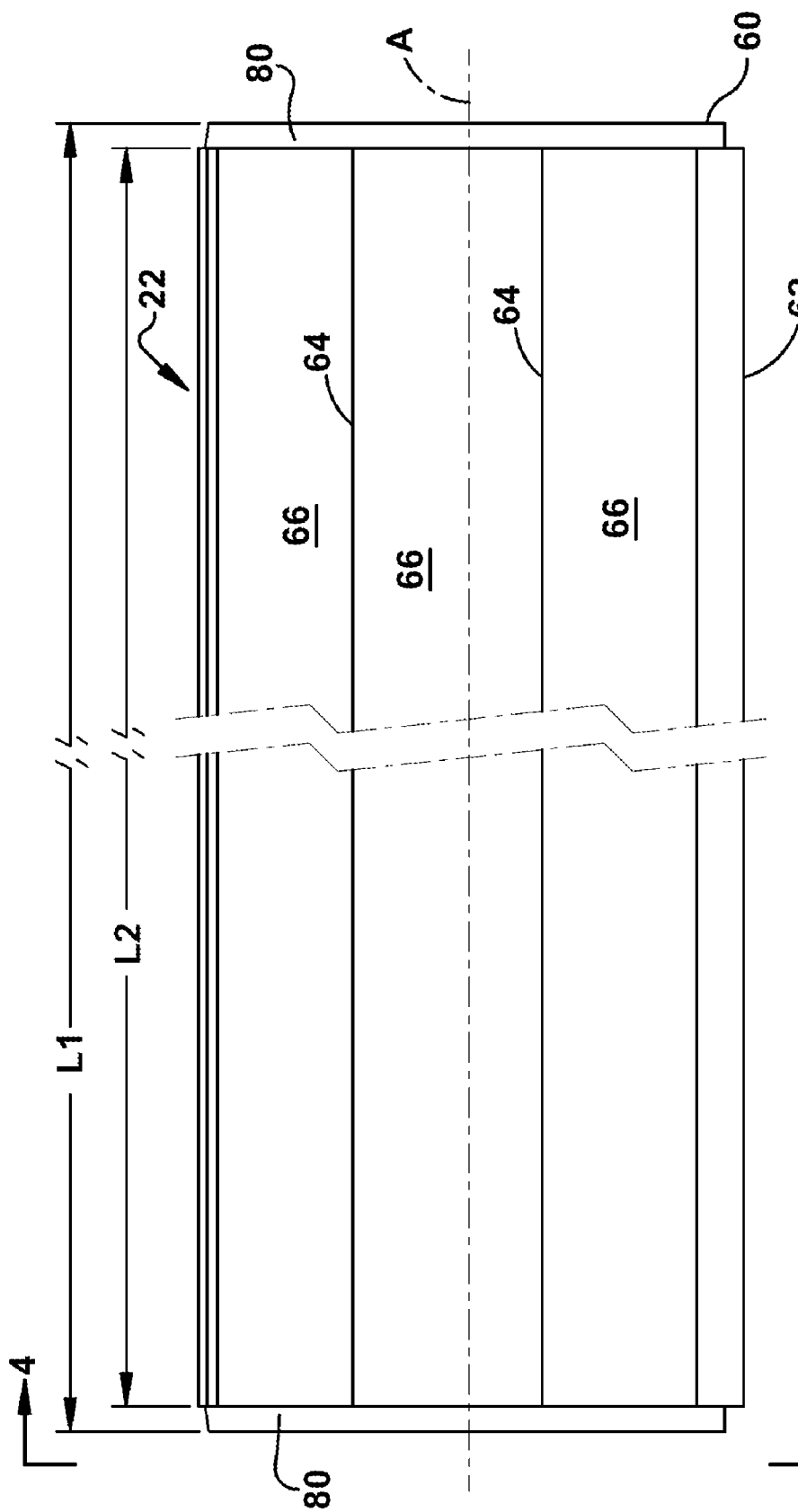

RADIATION DETECTOR

BACKGROUND OF THE INVENTION

The invention relates generally to radiation detectors. In particular, the invention relates to a flexible support mechanism for radiation detector components and a method of servicing the radiation detector.

Radiation detectors are known in the well drilling industry for logging and measure while drilling applications. When a radiation detector is incorporated into a logging tool of a tool string used for drilling of oil, gas and water wells, the logging tool identifies, locates and differentiates geologic formations along a well bore. Tool strings and logging tools for oil wells are often exposed to harsh operating environments including temperatures in the range of 175° C. to 200° C. and pressures in the range of 10,000 to 20,000 psi along with severe shock and vibration.

A known radiation detector includes a scintillator coupled to a photomultiplier tube. Radiation, such as gamma rays emitted by geologic formations adjacent to the well, is converted to light by the scintillator and conducted to the photomultiplier tube. The photomultiplier tube converts the light into an amplified electrical signal. The amplified electrical signal is then measured and used by monitoring electronics as a function of the radiation detected by the scintillator.

The components of the radiation detector are sensitive pieces of equipment. The components are typically mounted in a housing to withstand the harsh operating environment they are exposed to. The components of the radiation detector also require periodic individual inspection to assure that they are providing correct and repeatable information during their service lives. However, it has been found that the typical known mounting systems do not lend themselves to easy disassembly and separation of the components. It has also been found that disassembly can damage components of the radiation detector, the housing the radiation detector is supported in and the mounting system itself.

It is, therefore, advantageous to provide a radiation detector that is capable of withstanding the harsh operating environment it is exposed to while permitting ease of disassembly for inspection and repair with minimal or no damage to components of the radiation detector.

BRIEF DESCRIPTION OF THE INVENTION

One aspect of the invention is a radiation detector that comprises a tool housing. The tool housing has a substantially cylindrical tubular shape. A radiation sensor generates a signal in response to detecting radiation. The radiation sensor is locatable within the tool housing. A signal processor is operably connectable with the radiation sensor. The signal processor receives the signal from the radiation sensor and generates an electrical signal as a function of the signal received. The signal processor is locatable within the tool housing. A flex-sleeve supports at least one of the radiation sensor and signal processor within the tool housing. The flex-sleeve comprises a substantially cylindrical portion and a coaxially extending polygonal portion for engagement and supportive interaction with the cylindrical portion.

Another aspect of the invention is a radiation detector that comprises a tool housing. The tool housing has a substantially cylindrical tubular shape. A radiation scintillator sensor comprises a crystal material for generating a light signal as a function of radiation detected. The radiation scintillator sensor is locatable within the tool housing. A photomultiplier tube is operably connectable with the radiation scintillator sensor. The photomultiplier tube receives the light signal from the radiation scintillator sensor and generates an electrical signal as a function of the light signal received. The photomultiplier tube is locatable within the tool housing. A flex-sleeve supports the radiation scintillator sensor and photomultiplier tube within the tool housing. The flex-sleeve comprises a substantially cylindrical portion and a coaxially extending polygonal portion for engagement and supportive interaction with the cylindrical portion.

Yet another aspect of the invention is a method of inspecting and servicing a radiation detector that has a flex-sleeve for supporting a radiation scintillator sensor and a photomultiplier tube within a tubular tool housing. The flex-sleeve has a substantially cylindrical portion located radially inward of a relatively shorter length polygonal portion. The method comprises the steps of removing the flex-sleeve, the radiation scintillator sensor and the photomultiplier tube from within the tool housing without damaging the tool housing. The radiation scintillator sensor and the photomultiplier tube are removed from within the flex-sleeve. The radiation scintillator sensor and the photomultiplier tube are inspected for serviceability. One of the radiation scintillator sensor and the photomultiplier tube are replaced if during the inspection step either is determined to be unserviceable. The radiation scintillator sensor and the photomultiplier tube are replaced within the flex-sleeve. The flex-sleeve, serviceable radiation detector and serviceable photomultiplier tube are installed in the tool housing without causing damage to the tool housing.

DESCRIPTION OF THE DRAWINGS

These and other features, aspects, and advantages of the invention will be better understood when the following detailed description is read with reference to the accompanying drawings, in which:

FIG. 3 is an enlarged side elevation view of a flex-sleeve of the radiation detector illustrated in FIGS. 1 and 2;

DETAILED DESCRIPTION OF THE INVENTION

Figure 1:
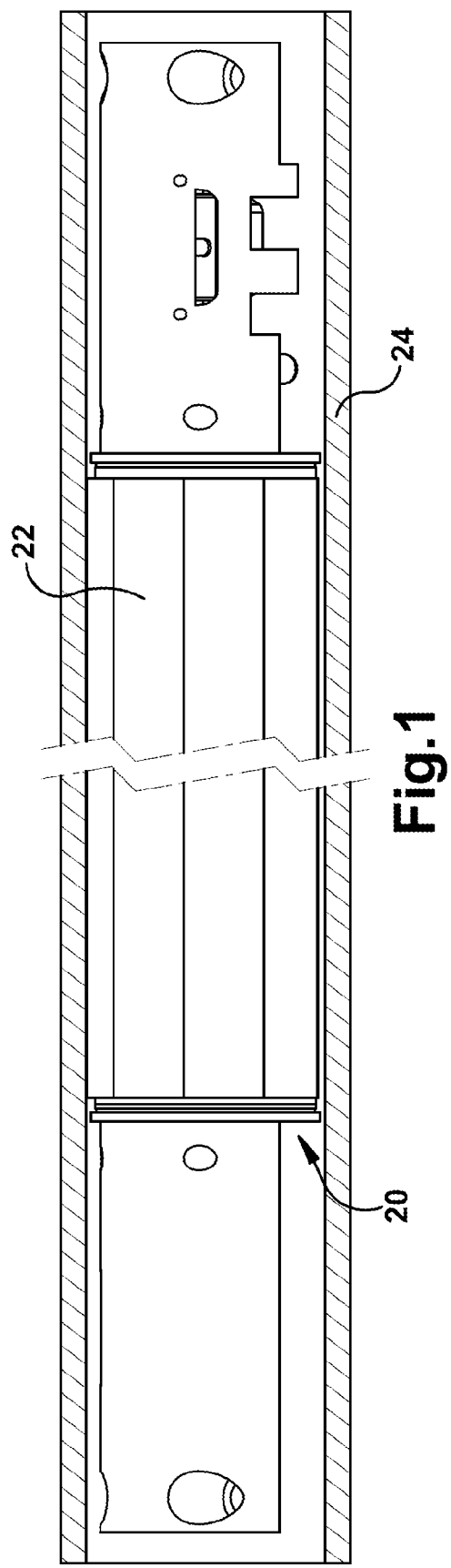
FIG. 1 is a side elevation view, partly in section, illustrating a radiation detector according to one aspect of the invention in a tool housing.
Figure 2:
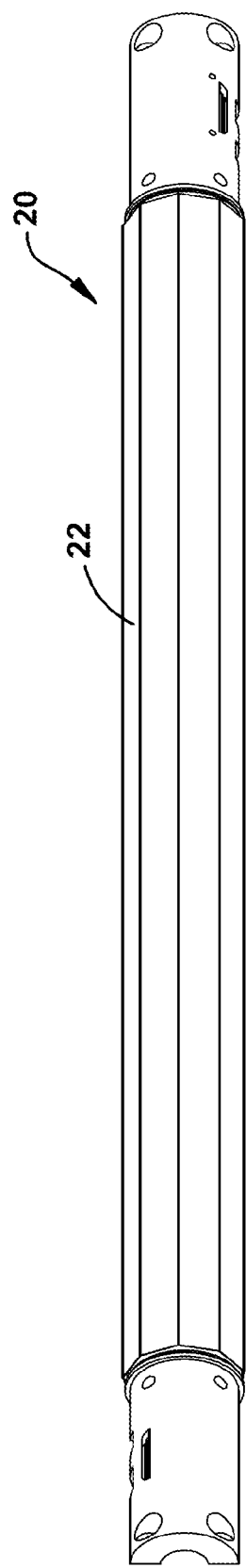
FIG. 2 is a side elevation view of the radiation detector illustrated in FIG. 1.
Figure 5:
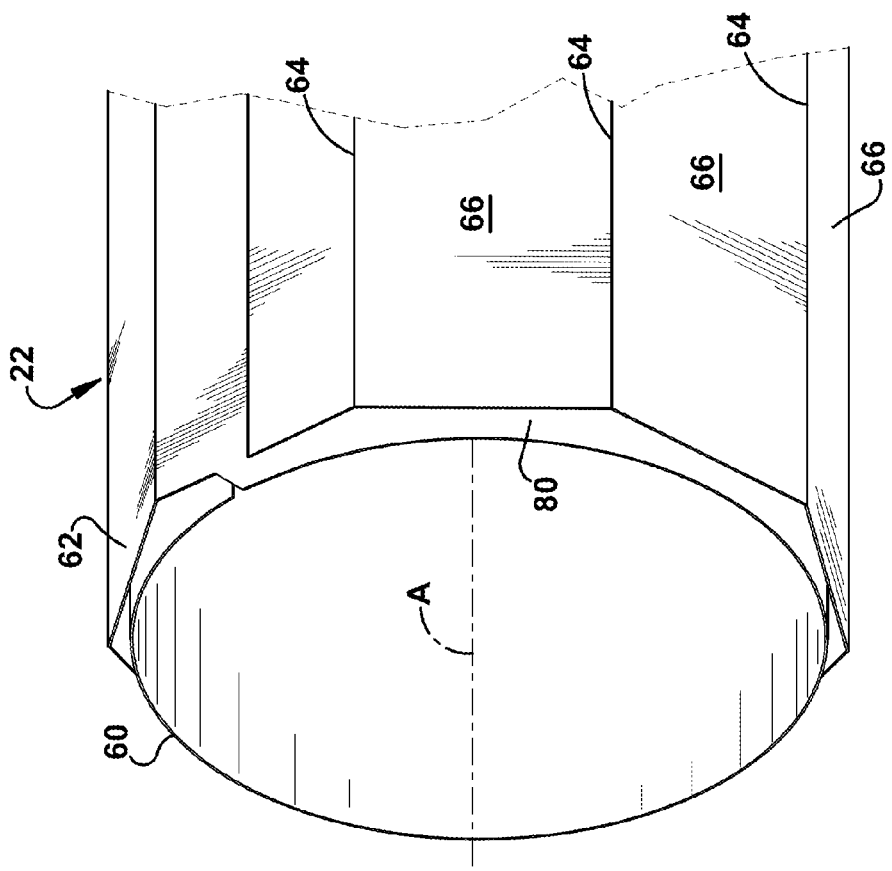
FIG. 5 is perspective view of a portion of the flex-sleeve illustrated in FIG. 3.
Figure 4:
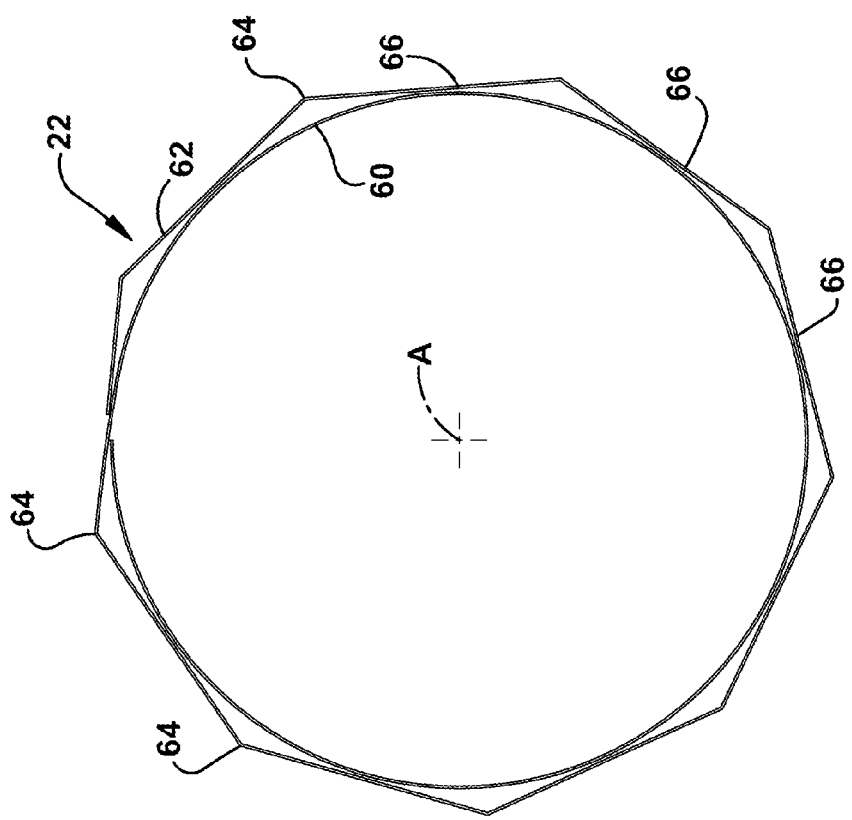
FIG. 4 is an end view of the flex-sleeve taken approximately along the line 4-4 in FIG. 3.

A radiation detector 20 according to one aspect of the invention is illustrated in FIGS. 1-2. The radiation detector 20 may be used for detecting and measuring levels or energies of gamma radiation from various sources and in various applications. The radiation detector 20 includes a flex-sleeve 22, according to one aspect of the invention, to mount and support the radiation detector in a tool housing 24. The tool housing 24 is tubular and has a substantially cylindrical outer surface. The tool housing 24 is made from any suitable material, such as a metal including copper beryllium, inconel or stainless steel. The tool housing 24 protects the radiation detector 20 from the harsh environment that the radiation detector operates in.

Figure 6:
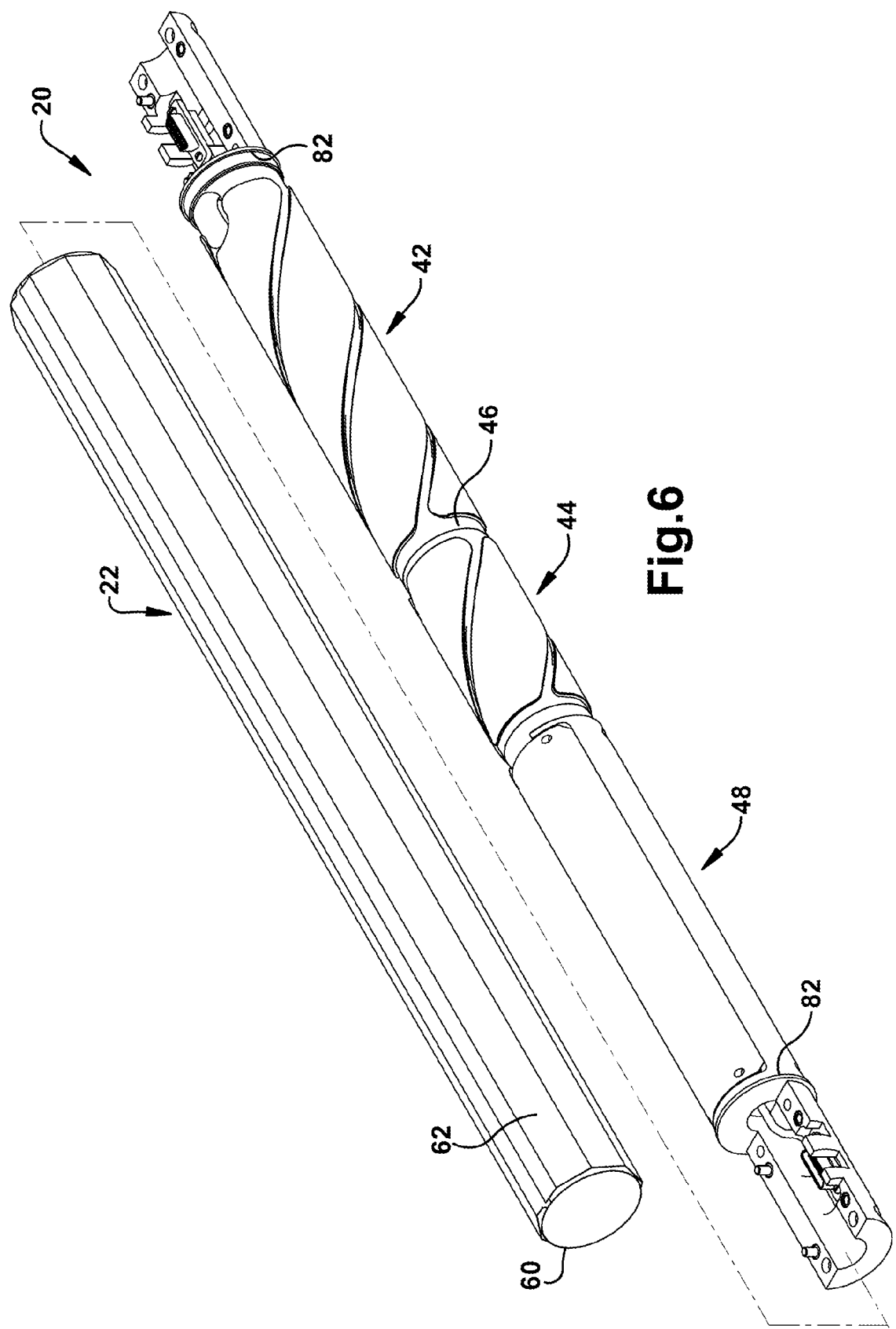
FIG. 6 is an exploded perspective view of the radiation detector illustrated in FIG. 1.

The radiation detector 20 includes major operating components, such as a radiation scintillator sensor assembly 42 (FIG. 6), a photomultiplier tube assembly 44 and an electronics module assembly 48. The radiation scintillator sensor 42 has a substantially cylindrical shape. The radiation scintillator sensor 42 includes a crystal (not shown) for generating a signal indicative of a scintillation event, such as when radiation of a certain level or energy is detected or sensed. For example, radiation, such as gamma rays, is converted to light by the crystal scintillator of the radiation scintillator sensor 42 as a function of the radiation detected. For example, the crystal may be a cylindrical sodium iodide crystal doped with thallium (NaI(Tl)). Also by way of example, the crystal may have a diameter of one inch and may be up to five inches in length. The radiation scintillator sensor 42 may include other devices capable of scintillation from radiation.

The crystal of the radiation scintillator sensor 42 generates a light signal as a function of radiation detected by some of the radiation interacting with the crystal, as is known. For example, the light signal is generated as a function of the presence and amount of gamma radiation delivered to the radiation scintillator sensor 42. The radiation scintillator sensor 42 further includes a scintillator housing for supporting a crystal. The scintillator housing may be made of any suitable material, such as titanium, prepared aluminum or stainless steel. The radiation scintillator sensor 42 may also include support structure located between the scintillator housing and the crystal.

It is known that the crystal is relatively brittle and fragile. It is very important that the crystal radiation scintillator sensor 42 is properly supported within the scintillator housing and that the radiation detector 20 is properly supported in the tool housing 24 to prevent damage to the crystal during use. It is known that the crystal may react to the temperatures, pressures, shock and vibration that it is exposed to during its service life. Thus, it is desirable to periodically inspect the radiation scintillator sensor 42 by itself to determine if it is still serviceable.

The photomultiplier tube 44 is substantially cylindrical in shape. The photomultiplier tube 44 is located axially adjacent the radiation scintillator sensor 42 in the radiation detector 20. The photomultiplier tube 44 is operably and electrically connected to the crystal of the radiation scintillator sensor 42. The photomultiplier tube 44 receives the light signal from the crystal and generates an electrical signal as a function of the light signal received. The photomultiplier tube 44 includes a photo detector to receive the light signal from the crystal of the radiation scintillator sensor 42 and electronics to process the electrical signal.

The photomultiplier tube 44 may be any of several known photomultiplier tube assemblies. In the illustrated example, the photomultiplier tube 44 has an outer diameter substantially identical to that of the radiation scintillator sensor 42.

The photomultiplier tube 44 includes a tube housing that supports the photomultiplier tube. The tube housing may be made of any suitable material, such as titanium, prepared aluminum or stainless steel. The radiation scintillator sensor 42 and photomultiplier tube 44 may have a groove 46 in its outer surface for accepting a wire or cable from the electronics module 48. The photomultiplier tube 44 may also include structure supporting the photo detector within the tube housing.

The radiation scintillator sensor 42 and the photomultiplier tube 44 are protected from the severe operating environment by the tool housing 24. The flex-sleeve 22 supports the radiation scintillator sensor 42 and the photomultiplier tube 44 in the tool housing 24 in a manner that shock and vibration transmitted to the radiation detector 20 from the tool housing 24 is minimized. The flex-sleeve 22 according to one aspect of the invention also permits relatively easy installation and extraction of the radiation detector 20 with minimal or no damage to the tool housing 24, the radiation scintillator sensor 42 and the photomultiplier tube 44.

The flex-sleeve 22 includes a cylindrical portion 60 (FIGS. 3-6) and a polygonal portion 62. The cylindrical portion 60 is preferably integrally formed as one piece with the polygonal portion 62. The cylindrical portion 60 engages and interacts with the polygonal portion 62 to support the radiation scintillator sensor 42 and the photomultiplier tube 44 relative to the tool housing 24. The polygonal portion 62 extends coaxially with and surrounds at least a portion of the cylindrical portion 60.

The cylindrical portion 60 has an inner diameter substantially equal to the outer diameters of the radiation scintillator sensor 42 and the photomultiplier tube 44. The polygonal portion 62 has an outermost dimension substantially equal to the inner diameter of the tool housing 24. The polygonal portion 62 has a plurality of peaks 64 (FIGS. 4-5) formed at the outermost dimension of the polygonal portion between adjacent flats 66. The illustrated aspect has nine peaks 64 and eight full flats 66. It will be apparent that any suitable number of peaks 64 may be provided. The peaks 64 of the polygonal portion 62 engage the inner surface of the tool housing 24 to locate and support the radiation detector 20 in the tool housing. The flex-sleeve 22 is compressed within the tool housing 24 to preload the flex-sleeve spring action and provide axial damping due to friction. Maximum sensitivity of the radiation detector 20 often requires maximizing the diameter of the radiation scintillator sensor 42 while minimizing the material located between the radiation scintillator sensor and tool housing 24 for support and attenuation of vibration and shock of the radiation detector.

The cylindrical portion 60 has a length L1 (FIG. 3) taken in a direction parallel to the longitudinal central axis A of the flex-sleeve 22. The polygonal portion 62 has a length L2 (FIG. 3) taken in a direction parallel to the longitudinal central axis A of the flex-sleeve 22 that is less that the length L1 of the cylindrical portion 60. The flex-sleeve 22, thus, has a pair of cylindrical protrusions 80 (FIGS. 3 and 5) extending from axially opposite ends. These cylindrical protrusions 80 engage respective flanges 82 of the radiation detector 20.

Installing the radiation detector 20 within the tool housing 24 results in an axial force that will be absorbed by the cylindrical portion 60 of the flex-sleeve 22. No assembly force will be transmitted to the polygonal portion 62 that could deform or deflect the polygonal portion. Thus, during a disassembly operation the non-deformed polygonal portion 62 allows relatively easy removal of the radiation detector 20 from the tool housing for inspection and repair, if necessary. The polygonal portion 62 is formed to function as a plurality of leaf springs between the radiation scintillator sensor 42, the photomultiplier tube 44 and inside diameter of the tool housing 24. The support and resilience of the leaf spring action of the polygonal portion 62 is stretched along the length of the radiation scintillator sensor 42 and the photomultiplier tube 44. The integral cylindrical portion 60 spans any features on the outside diameter of the radiation scintillator sensor 42 and the photomultiplier tube 44. This allows consistent suspension of the contained radiation scintillator sensor 42, the photomultiplier tube 44 and electronics module 48.

Figure 7:
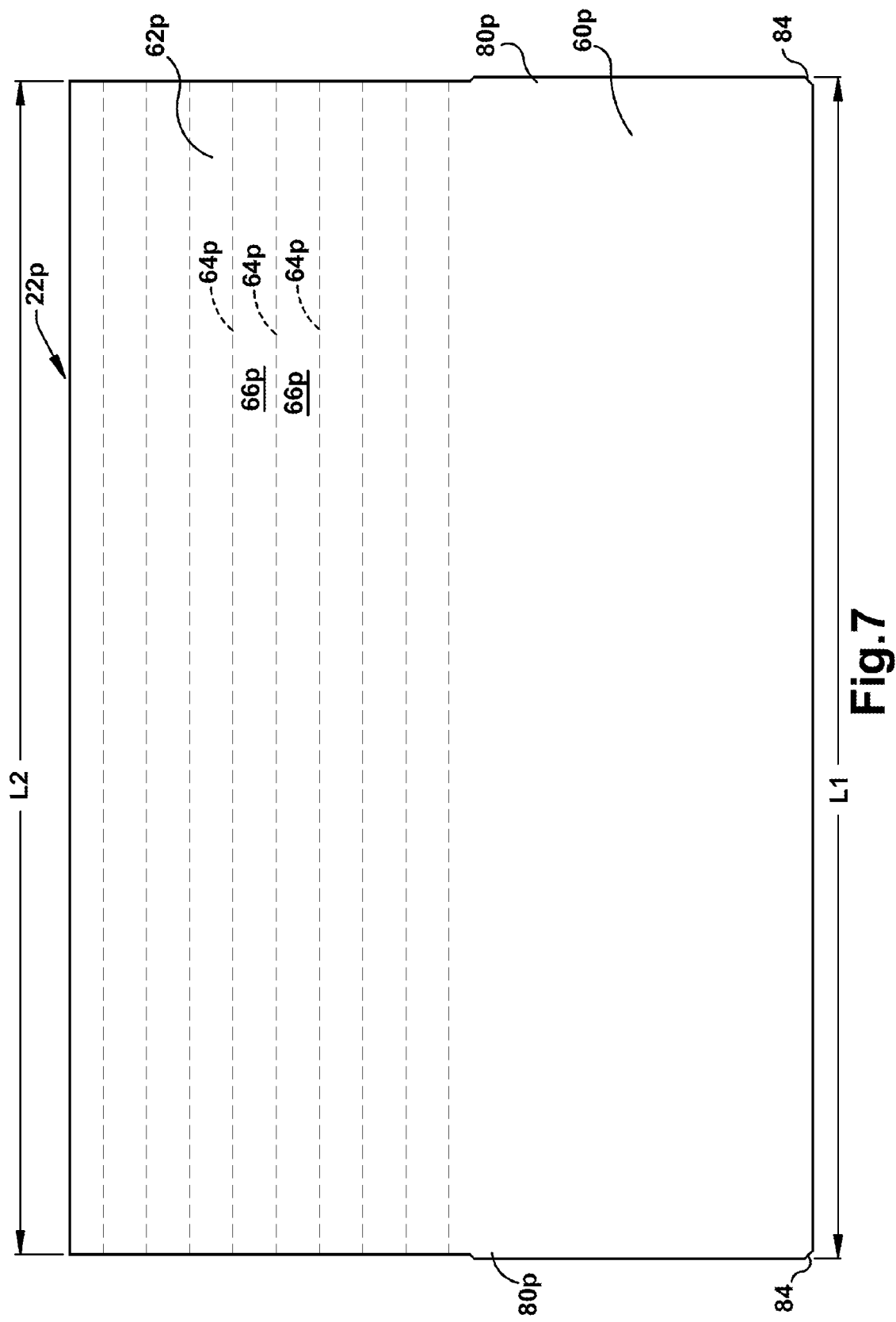
FIG. 7 is a plan view of sheet material use to make the flex-sleeve of the radiation detector.

The flex-sleeve 22 is preferably made from a substantially planar single piece 22p (FIG. 7) of a suitable resilient sheet material, such as hardened stainless steel. By way of example, the single piece 22p preferably has a thickness of about 0.004 inch but can be of any suitable thickness. The single piece 22p is deburred and corners 84 are broken so no sharp edges or corners remain in the finished flex-sleeve 22 that could catch on the inner surface of the tool housing 24.

The area 62p of the single piece 22p that makes up the polygonal portion 62 preferably has a suitable friction reducing material (not shown) applied to what will be the outer surface of the flex-sleeve 22. This application of friction reducing material could be before or after forming the finished configuration of the flex-sleeve 22. One such suitable friction reducing material is polytetrafluoroethylene (PTFE). The friction reducing material on outer surface of the flex-sleeve 22 allows the flex-sleeve to remain stationary on the radiation scintillator sensor 42, photomultiplier tube 44 and electronics module 48 while rotating within inside diameter of the tool housing 24 during installation and extraction. The friction reducing material may be sprayed on and may be applied only to areas that will form the peaks 64 for contacting the tool housing 24. The friction reducing material may alternatively be applied to the inner surface of the tool housing 24.

By way of example, the single piece 22p is bent at evenly spaced locations 64p that will form the peaks 64 and establish the flats 66 between adjacent peaks. The polygonal portion 62 is not yet in its finished configuration. The cylindrical portion 60 is then formed. The polygonal portion 62 is then wrapped around the cylindrical portion 60. It will be apparent that other processes and order of forming the portions of the flex-sleeve 22 can be used.

Another aspect of the invention is a method of inspecting and servicing a radiation detector 20. The radiation detector 20 is constructed as described above. The radiation detector 20 has a flex-sleeve 22 for supporting a radiation scintillator sensor 42 and a photomultiplier tube 44 within a tubular tool housing 24. The flex-sleeve 22 has a substantially cylindrical portion 60 located radially inward of a relatively shorter length polygonal portion 62.

The method includes of removing entire radiation detector 20 from the tool housing 24. This accomplished by removing the flex-sleeve 22, the radiation scintillator sensor 42, the photomultiplier tube 44 and the electronics module 48 of the radiation detector 20 as an assembly axially from the tool housing 24. Damage to the tool housing 24 is avoided because the radiation detector 20 according to one aspect of the invention is used.

The radiation scintillator sensor 42, the photomultiplier tube 44 and the electronics module 48 are removed from within the flex-sleeve 22 of the radiation detector 20. The radiation scintillator sensor 42, the photomultiplier tube 44 and the electronics module 48 are separated and tested for serviceability individually. The radiation scintillator sensor 42, the photomultiplier tube 44 and/or the electronics module 48 are replaced if during the testing/inspection step either is determined to be unserviceable. The serviceable radiation scintillator sensor 42, the serviceable photomultiplier tube 44 and the electronics module 48 are replaced within the flex-sleeve 22. A new flex-sleeve can be used if it is deemed unserviceable. The flex-sleeve 22, serviceable radiation scintillator sensor 42, serviceable photomultiplier tube 44 and serviceable electronics module 48 of the radiation detector 20 are installed in the tool housing 24 without causing damage to the tool housing.

While the invention has been described in terms of various specific embodiments, those skilled in the art will recognize that the invention extends beyond the specifically disclosed embodiments to other alternative embodiments and/or uses of the systems, techniques and obvious modifications and equivalents of those disclosed. It is intended that the scope of the invention disclosed should not be limited by the particular disclosed embodiments described above.

What is claimed is:

1. A radiation detector comprising:
   a tool housing, the tool housing having a substantially cylindrical tubular shape;
   a radiation sensor for generating a signal in response to detecting radiation, the radiation sensor locatable within the tool housing;
   a signal processor operably connectable with the radiation sensor and for receiving the signal from the radiation sensor and generating an electrical signal as a function of the signal received, the signal processor locatable within the tool housing; and
   a flex-sleeve for supporting at least one of the radiation sensor and signal processor within the tool housing, the flex-sleeve comprising a substantially cylindrical portion and a coaxially extending polygonal portion for engagement and supportive interaction with the cylindrical portion.

2. The radiation detector of claim 1 wherein the cylindrical portion and the polygonal portion of the flex-sleeve are formed from a single piece of resilient sheet material.

3. The radiation detector of claim 1 wherein one of the cylindrical portion and the polygonal portion of the flex-sleeve surrounds at least a portion of the other of the cylindrical portion and the polygonal portion of the flex-sleeve.

4. The radiation detector of claim 1 wherein the cylindrical portion of the flex-sleeve is located radially within the polygonal portion of the flex-sleeve.

5. The radiation detector of claim 1 wherein the flex-sleeve supports both the radiation sensor and signal processor within the tool housing.

6. The radiation detector of claim 1 wherein the cylindrical portion of the flex-sleeve is longer than the polygonal portion of the flex-sleeve.

7. The radiation detector of claim 1 further including a friction reducing material on at least a portion of one of the polygonal portion of the flex-sleeve and tool housing.

8. The radiation detector of claim 1 wherein the polygonal portion of the flex-sleeve is free of sharp edges and burrs that could otherwise tend to damage the tool housing during relative movement therebetween.

9. A radiation detector comprising:
   a tool housing, the tool housing having a substantially cylindrical tubular shape;
   a radiation scintillator sensor comprising a crystal material for generating a light signal as a function of radiation detected, the radiation scintillator sensor being locatable within the tool housing;
   a photomultiplier tube operably connectable with the radiation scintillator sensor and for receiving the light signal from the radiation scintillator sensor and generating an electrical signal as a function of the light signal received, the photomultiplier tube being locatable within the tool housing; and
   a flex-sleeve for supporting at the radiation scintillator sensor and photomultiplier tube within the tool housing, the flex-sleeve comprising a substantially cylindrical portion and a coaxially extending polygonal portion for engagement and supportive interaction with the cylindrical portion, and one of the cylindrical portion and the polygonal portion of the flex-sleeve surrounds at least a portion of the other of the cylindrical portion and the polygonal portion of the flex-sleeve.

10. The radiation detector of claim 9 wherein the cylindrical portion and the polygonal portion of the flex-sleeve are formed from a single piece of resilient sheet material.

11. The radiation detector of claim 9 wherein the cylindrical portion of the flex-sleeve is located radially within the polygonal portion of the flex-sleeve.

12. The radiation detector of claim 9 wherein the cylindrical portion of the flex-sleeve is longer than the polygonal portion of the flex-sleeve.

13. The radiation detector of claim 9 further including a friction reducing material on at least a portion of one of the polygonal portion of the flex-sleeve and tool housing.

14. The radiation detector of claim 9 wherein the polygonal portion of the flex-sleeve is free of sharp edges and burrs that could otherwise tend to damage the tool housing during relative movement therebetween.

\* \* \* \* \*